United States Patent
Xu et al.

(10) Patent No.: US 10,556,212 B2
(45) Date of Patent: Feb. 11, 2020

(54) SCALE COLLECTION DEVICE FOR DOWNFLOW REACTORS

(71) Applicant: UOP LLC, Des Plaines, IL (US)

(72) Inventors: Zhanping Xu, Inverness, IL (US); Pengfei Chen, Glenview, IL (US); Robert L. Bunting, Jr., Chicago, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 16/221,025

(22) Filed: Dec. 14, 2018

(65) Prior Publication Data

US 2019/0193038 A1 Jun. 27, 2019

Related U.S. Application Data

(60) Provisional application No. 62/609,317, filed on Dec. 21, 2017.

(51) Int. Cl.
*B01J 8/00* (2006.01)
*B01D 24/12* (2006.01)

(52) U.S. Cl.
CPC .............. *B01J 8/006* (2013.01); *B01D 24/12* (2013.01); *B01J 8/0085* (2013.01); *B01D 2101/00* (2013.01); *B01J 2204/002* (2013.01)

(58) Field of Classification Search
CPC .......... B01J 8/0085; B01J 8/008; B01J 8/006; B01D 24/12
See application file for complete search history.

(56) References Cited

U.S. PATENT DOCUMENTS

| | | |
|---|---|---|
| 3,607,000 A | 9/1971 | Beal et al. |
| 4,380,529 A | 4/1983 | Gupta |
| 4,836,989 A | 6/1989 | Aly et al. |
| 5,484,578 A | 1/1996 | Muldowney et al. |
| 8,181,942 B2 | 5/2012 | Sechrist |
| 8,487,151 B2 | 7/2013 | Koudil et al. |
| 8,673,246 B2 | 3/2014 | Chen et al. |
| 9,364,810 B2 | 6/2016 | Merkel et al. |
| 9,480,957 B2 | 11/2016 | Bazer-Bachi et al. |
| 2011/0201856 A1* | 8/2011 | Cottard .................... B01J 8/006 585/250 |

(Continued)

FOREIGN PATENT DOCUMENTS

| | | |
|---|---|---|
| CN | 103131472 A | 6/2013 |
| WO | 2006076923 A1 | 7/2006 |

(Continued)

OTHER PUBLICATIONS

International Search Report and Written Opinion from corresponding PCT Application No. PCT/US2018/066666, dated Apr. 4, 2019.

(Continued)

*Primary Examiner* — Lessanework Seifu

(57) ABSTRACT

The invention involves a scale collection device that is located within downflow reactor head for removing solids from feed streams to increase reactor operating cycle time without impact on effective reactor space for catalyst loading and reactor pressure drop. More particularly, a scale collection device is located in an upper portion of a reactor vessel above a rough liquid distribution tray and a vapor-liquid distribution tray.

20 Claims, 1 Drawing Sheet

(56) References Cited

U.S. PATENT DOCUMENTS

2017/0015917 A1* 1/2017 Muller .................. B01J 8/0492

FOREIGN PATENT DOCUMENTS

| WO | 2007023225 A1 | 3/2007 |
| WO | 2015036066 A1 | 3/2015 |

OTHER PUBLICATIONS

International Search Report and Written Opinion from corresponding PCT Application No. PCT/US2018/066659, dated Mar. 28, 2019.
International Search Report and Written Opinion from corresponding PCT Application No. PCT/US2018/066684, dated Mar. 21, 2019.
International Search Report and Written Opinion from corresponding PCT Application No. PCT/US2018/066663, dated Mar. 28, 2019.
International Search Report and Written Opinion from corresponding PCT Application No. PCT/US2018/066678, dated Apr. 4, 2019.
International Search Report and Written Opinion from corresponding PCT Application No. PCT/US2018/066682, dated Apr. 4, 2019.

* cited by examiner

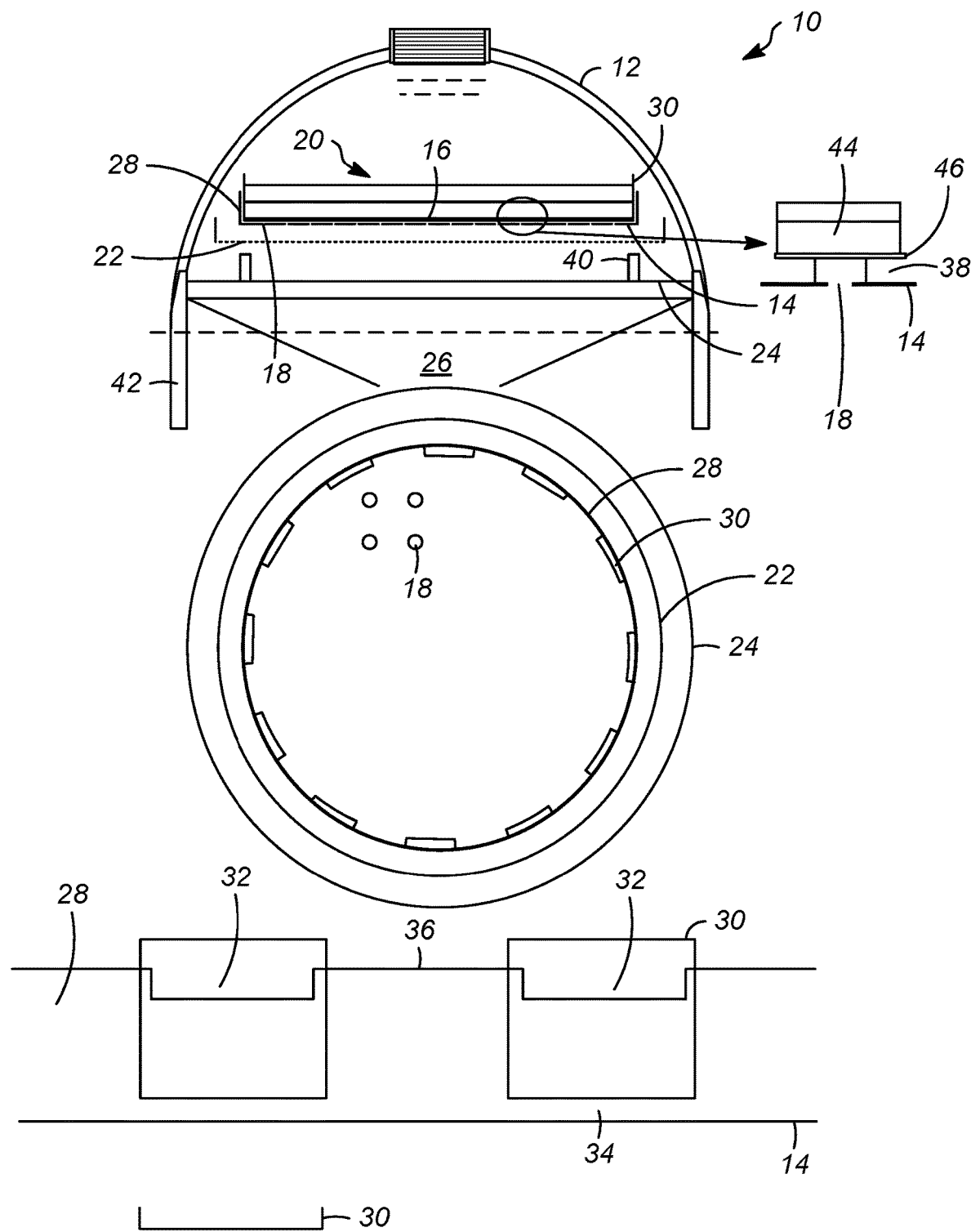

SCALE COLLECTION DEVICE FOR DOWNFLOW REACTORS

CROSS-REFERENCE TO RELATED APPLICATION

This application claims priority from U.S. Provisional Application No. 62/609,317 filed Dec. 21, 2017, the contents of which cited application are hereby incorporated by reference in its entirety.

FIELD OF THE INVENTION

The invention relates to a device for improved operation of downflow reactors. More particularly, the invention involves a scale collection device that is located within a downflow reactor top head for removing solids from feed streams to increase reactor operating cycle time without impact on effective reactor space for catalyst loading and reactor pressure drop.

BACKGROUND OF THE INVENTION

In downflow reactors, such as downflow reactors, a layer of filtering material is often placed on top of the first catalyst bed to catch particles such as fines and scales. Typically, this layer may be 6 to 36 inches thick and reduces the space available for the catalyst to occupy. In addition, the filtering material has to be removed and replaced within an operating cycle when solids accumulate within the layer of filtering material or between the filtering material and catalyst bed causing a high pressure drop. In commercial operation, the feed rates may vary widely (e.g. 60 to 110% of design). The challenge is to design a scale collection device that can effectively remove solids from reactor feed streams without reducing reactor volume available for catalyst loading and can be easily cleaned and maintained during turnaround.

SUMMARY OF THE INVENTION

The invention involves a reactor comprising an upper portion and a lower portion wherein the upper portion contains a scale collection device. The scale collection device is composed of a tray and filtering material within the tray forming a filtering zone. The scale collection device is located above a rough liquid distribution tray and wherein a vapor-liquid distribution tray is located below said rough liquid distribution tray and wherein the lower portion contains a catalyst bed. The filtering zone may comprise a single layer or multiple layers of filtering materials having the same or different physical and chemical properties. The filtering zone contains porous ceramic pellets or other materials that achieve a similar function. The scale collection device may be spaced above the rough liquid distribution tray by a plurality of spacers or beams. The tray has a perforated bottom plate and a cylindrical side wall with a plurality of chimneys attached to the side wall for liquid overflow such that the tray can be operated in a wide range of liquid flows while maintaining liquid full during operation for maximizing solid removal efficiency. The overflow liquid has to enter the chimneys from the bottom via a clearance close to the tray floor, such that fluid will not bypass the filtering zone for solids removal.

BRIEF DESCRIPTION OF THE DRAWING

The FIGURE shows the upper portion of a reactor showing a scale collection device located above the distribution trays.

DETAILED DESCRIPTION OF THE INVENTION

It has now been found that a different arrangement has advantages to filter particles from a feed stream in a downflow reactor. More particularly, a scale collection device is located within an upper portion of a downflow reactor or reactor head for removing solids from feed streams and to increase reactor operating cycle time without any impact on the amount of effective reactor space for catalyst loading or creating additional bed pressure drop. It has also been found that the solid removal efficiency and the effective use of the filtering material for solid removal can be greatly improved by maintaining a certain liquid level within the device to improve uniformity of liquid flow distribution and to reduce liquid flow velocity through the filtering zone. This is achieved by a specially designed scale collection device located within a reactor head. As shown in the FIGURE, the scale collection device is constructed with a cylindrical side wall with multiple chimneys attached, a perforated bottom plate, one or more layers of filtering materials with the same or different physical and chemical properties and a bed support/spacer resting on the bottom perforated plate creating a small clearance between the bottom perforated plate and the filtering materials. There may be a hold-down grid at top of the filtering material to keep the filtering material from moving around. The top of the cylindrical side wall is notched for controlling liquid overflow around the top of the wall at high feed rates. The chimneys are extended above the top of the side wall forming a series of troughs between chimneys for controlling liquid overflow around the top of the side wall in case that the filter bed is plugged with solids restricting liquid flow through the bed. The liquid from the perforated bottom plate and the overflow liquid around the side wall are intercepted by a larger-diameter rough liquid distribution tray below for redistributing liquid across the tray to a vapor-liquid distribution tray below. It is contemplated that the scale collection tray may be used without a rough liquid distribution tray below it as well.

Gas and liquid enter into the reactor through an inlet distributor. The liquid is distributed across the top of the scale collection device. Gas is separated from liquid in the space between the inlet distributor and top of the scale collection device. The liquid flows downward through the scale collection device while the gas through an open annular area between the cylindrical side wall and reactor head. With gas bypassing the filtering material, the pressure drop will not increase even with the filtering material filled with solids.

With this design, the reactor cycle time can be increased by the addition of a filter bed within the top reactor head or catalyst loading can be increased by reducing the filter material required on top of the catalyst bed.

The liquid exiting the scale collection device is redistributed by the rough liquid distribution tray below. Gas and liquid are then distributed through a vapor-liquid distribution tray in fluid communication with the rough liquid distribution tray to the catalyst bed. The rough distribution tray includes an outer cylindrical wall for liquid retention.

As shown in the FIGURE, according to one or more embodiments of the present invention, in order to remove the scales and fines in a liquid stream from within reactor 10 is shown an outer reactor shell having a rounded upper portion 12. The lower portion of reactor 10 contains a catalyst bed 26. A scale collection device 20 is located above a rough liquid distribution tray 22 and a vapor-liquid distribution tray 24. In the scale collection device 20, a filtering zone 16 is located a small distance above the bottom plate 14 that has a series of openings 18. Sections of the bed support/spacer 38 are placed within the cylindrical side wall 28 on the bottom perforated plate 14 for supporting the filtering material in filtering zone 16. The bed support/spacer 38 is mostly open (over 50%) for not restricting liquid flow through the scale collection device to the rough liquid distribution tray 22. The total open area of the perforations 18 on bottom plate 14 is designed such that a certain liquid level is maintained within the scale collection device at the minimum operating liquid load. The top of cylindrical side wall 28 of the scale collection device 20 has notches or openings 32, such as triangular or rectangular openings for liquid overflow at high operating liquid loads. To prevent the overflow liquid from bypassing the filtering zone without filtration, one or more "U" channels 30 are attached to the inside of the cylindrical side wall 28 to form chimneys around the side wall 28 for liquid overflow and the overflow liquid can only enter the chimneys from a gap 34 between the bottom of the "U" channel 30 and the bottom perforated plate 14. In the event that the filtering bed is plugged by solids, the liquid flows over the top 36 of the side wall 28 between "U" channels 30. The liquid from the scale collection device then passes down to a larger-diameter rough liquid distribution tray 22 for redistribution to a vapor-liquid distribution tray 24. The gas and liquid from the vapor-liquid distribution tray 24 then pass to the catalyst bed 26 below. The vapor-liquid distribution tray 24 has numerous distributors 40 for uniformly distributing gas and liquid across the top of the catalyst bed 26 below.

In one embodiment, the scale collection device 20, the rough liquid distribution tray 22 and the vapor-liquid distribution tray 24 can be supported by a single set of double-level beams on one support ring attached to the reactor shell 42 or by two sets of beams on two separate supports rings attached to the reactor shell 42.

The filter material 44 used in the filtering zone 16 may comprise pellets, sheets or other configuration of a porous material as known in the art. Preferred materials for the filtering zone are ceramic pellets which have a high internal porosity, such as the products available from Crystaphase Technologies, Inc., located in Houston, Tex. USA. One or more layers of the filtering materials 44 with the same or different physical and chemical properties may be used in the filtering zone 16. Other filtering materials may be used, for example, membrane filters, sand filters, and other similar filter materials. The bed support/spacer 38 or bed support/spacer 38 with a wire mesh sheet 46 above, upon which the filtering material 44 is supported has openings that are smaller than the size of the filter material 44.

With respect to the collection of the solid materials from the liquid, the configuration also reduces the tendency of rough liquid distribution tray 22, and vapor-liquid distribution tray 24 being plugged by solids. The quality of liquid distribution through the rough liquid distribution tray 22 and vapor-liquid distribution tray 24 was also found improved due to the reduced disturbance of liquid on the rough liquid distribution tray 22 due to the scale collection device 20 above.

The filtering materials can be loaded into the scale collection device with various methods such as socket or bucket and removed by vacuum. The device is easy to clean and maintain after the filtering materials are removed during turn-around.

As the entire scale collection device is filled with filtering materials 44 and the total void fraction of the filtering materials can be as high as 93%, the device has a high solid removal capacity. The solid removal efficiency is also high due to the special design of the scale collection device with the filtering material mostly submerged in the liquid pool and no liquid bypassing the device without filtration before the device reaches the full capacity of solid removal.

Specific Embodiments

While the following is described in conjunction with specific embodiments, it will be understood that this description is intended to illustrate and not limit the scope of the preceding description and the appended claims.

A first embodiment of the invention is an apparatus comprising an upper portion and a lower portion wherein the upper portion contains a scale collection device above a rough liquid distribution tray, wherein a vapor-liquid distribution tray is located below the rough liquid distribution tray and wherein the scale collection device comprises bottom plate having a plurality of perforations and a side wall with chimneys along the wall. An embodiment of the invention is one, any or all of prior embodiments in this paragraph up through the first embodiment in this paragraph, wherein the scale collection device has a filtering zone spaced a short distance above bottom plate and the filtering zone comprises a single layer of filtering material having the same physical and chemical properties. An embodiment of the invention is one, any or all of prior embodiments in this paragraph up through the first embodiment in this paragraph, wherein the scale collection device has a filtering zone with two or more layers of filtering materials with different physical or chemical properties. An embodiment of the invention is one, any or all of prior embodiments in this paragraph up through the first embodiment in this paragraph, wherein the filtering zone comprises porous ceramic pellets. An embodiment of the invention is one, any or all of prior embodiments in this paragraph up through the first embodiment in this paragraph, wherein the filtering zone comprises filtering materials containing active materials for promoting certain chemical reactions. An embodiment of the invention is one, any or all of prior embodiments in this paragraph up through the first embodiment in this paragraph, wherein the scale collection device is spaced above the rough liquid distribution tray by a plurality of spacers or beams. An embodiment of the invention is one, any or all of prior embodiments in this paragraph up through the first embodiment in this paragraph, wherein the scale collection device comprises profile wire. An embodiment of the invention is one, any or all of prior embodiments in this paragraph up through the first embodiment in this paragraph, wherein the scale collection device comprises grating. An embodiment of the invention is one, any or all of prior embodiments in this paragraph up through the first embodiment in this paragraph, wherein the scale collection device comprises wire mesh. An embodiment of the invention is one, any or all of prior embodiments in this paragraph up through the first embodiment in this paragraph, wherein the scale collection device comprises a perforated plate. An embodiment of the invention is one, any or all of prior embodiments in this paragraph up through the first embodiment in this paragraph, wherein the scale collection device contain chimneys. An embodiment of the invention is one, any or all of prior embodiments in this paragraph up through the first embodiment in this paragraph, wherein the chimneys are formed by attached "U" channels to the side wall of the scale collection device. An embodiment of the invention is one, any or all of prior embodiments in this paragraph up through the first embodiment in this paragraph, wherein the side wall of the scale collection device contain notches. An embodiment of the invention is one, any or all of prior embodiments in this paragraph up through the first embodiment in this paragraph, wherein the "U" channels are spaced above the bottom plate of the scale collection device. An embodiment of the invention is one, any or all of prior embodiments in this paragraph up through the first embodiment in this paragraph, wherein the "U" channels are extended above the top of the side wall. An embodiment of the invention is one, any or all of prior embodiments in this paragraph up through the first embodiment in this paragraph, wherein the rough liquid distribution tray contains holes sized to generate the desired liquid level on the rough liquid distribution tray.

A second embodiment of the invention is an apparatus comprising an upper portion and a lower portion wherein the upper portion contains a scale collection device located above a rough liquid distribution tray, wherein a vapor-liquid distribution tray is located below the rough liquid distribution tray and wherein the vapor-liquid distribution tray comprises a plurality of distributors. An embodiment of the invention is one, any or all of prior embodiments in this paragraph up through the second embodiment in this paragraph, wherein the scale collection device comprises a filtering zone, wherein the filtering zone comprises one or more layers of filtering materials having the same or different physical or chemical properties. An embodiment of the invention is one, any or all of prior embodiments in this paragraph up through the second embodiment in this paragraph, wherein the filtering zone comprises porous ceramic pellets. An embodiment of the invention is one, any or all of prior embodiments in this paragraph up through the second embodiment in this paragraph, wherein the rough liquid distribution tray contains holes sized to generate the desired liquid level on the rough liquid distribution tray.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims. In the foregoing, all temperatures are set forth in degrees Celsius and, all parts and percentages are by weight, unless otherwise indicated.

The invention claimed is:

1. A reactor comprising an upper portion and a lower portion wherein the upper portion contains a scale collection device above a rough liquid distribution tray, wherein a vapor-liquid distribution tray is located below the rough liquid distribution tray and wherein the scale collection device comprises a bottom plate having a plurality of perforations and a side wall with chimneys along the wall.

2. The reactor of claim 1, wherein the scale collection device has a filtering zone spaced a short distance above bottom plate and the filtering zone comprises a single layer of filtering material having the same physical and chemical properties.

3. The reactor of claim 1, wherein the scale collection device has a filtering zone with two or more layers of filtering materials with different physical or chemical properties.

4. The reactor of claim 1, wherein the scale collection device has a filtering zone and wherein the filtering zone comprises porous ceramic pellets.

5. The reactor of claim 1, wherein the scale collection device has a filtering zone and wherein the filtering zone comprises filtering materials containing active materials for promoting certain chemical reactions.

6. The reactor of claim 1, wherein the scale collection device is spaced above the rough liquid distribution tray by a plurality of spacers or beams.

7. The reactor of claim 1, wherein the scale collection device comprises profile wire.

8. The reactor of claim 1, wherein the scale collection device comprises grating.

9. The reactor of claim 1, wherein the scale collection device comprises wire mesh.

10. The reactor of claim 1, wherein the perforations on the bottom plate of the scale collection device are sized to generate a desired liquid level within the scale collection device.

11. The reactor of claim 1, wherein the scale collection device contains chimneys.

12. The reactor of claim 11, wherein the chimneys are formed by attached "U" channels to the side wall of the scale collection device.

13. The reactor of claim 1, wherein the side wall of the scale collection device contains notches.

14. The reactor of claim 12, wherein the "U" channels are spaced above the bottom plate of the scale collection device.

15. The reactor of claim 12, wherein the "U" channels are extended above the top of the side wall.

16. The reactor of claim 1, wherein the rough liquid distribution tray contains holes are sized to generate the desired liquid level on the rough liquid distribution tray.

17. An apparatus comprising an upper portion and a lower portion wherein the upper portion contains a scale collection device located above a rough liquid distribution tray, wherein a vapor-liquid distribution tray is located below the rough liquid distribution tray and wherein the vapor-liquid distribution tray comprises a plurality of distributors, and wherein the scale collection device comprises a bottom plate having a plurality of perforations and a side wall with chimneys along the wall.

18. The apparatus of claim 17, wherein the scale collection device comprises a filtering zone, wherein the filtering zone comprises one or more layers of filtering materials having the same or different physical or chemical properties.

19. The apparatus of claim 18, wherein the filtering zone comprises porous ceramic pellets.

20. The apparatus of claim 17, wherein the rough liquid distribution tray contains holes sized to generate the desired liquid level on the rough liquid distribution tray.

* * * * *